(12) United States Patent
Setlhaku et al.

(10) Patent No.: US 12,440,817 B2
(45) Date of Patent: Oct. 14, 2025

(54) POLYMERIZATION PROCESS FOR OLEFINS

(71) Applicant: SABIC GLOBAL TECHNOLOGIES B.V., Bergen op Zoom (NL)

(72) Inventors: Mpho Prudence Setlhaku, Gladbeck (DE); Martin Alexander Zuideveld, Kelmis (BE); Bobby Johannes Henricus Hubertus Smeets, Spaubeek (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 849 days.

(21) Appl. No.: 17/763,440

(22) PCT Filed: Sep. 23, 2020

(86) PCT No.: PCT/EP2020/076634
§ 371 (c)(1),
(2) Date: Mar. 24, 2022

(87) PCT Pub. No.: WO2021/058607
PCT Pub. Date: Apr. 1, 2021

(65) Prior Publication Data
US 2022/0339592 A1  Oct. 27, 2022

(30) Foreign Application Priority Data
Sep. 24, 2019  (EP) .................................... 19199315

(51) Int. Cl.
*B01J 8/00* (2006.01)
*B01J 8/08* (2006.01)
(Continued)

(52) U.S. Cl.
CPC ............. *B01J 8/008* (2013.01); *B01J 8/0015* (2013.01); *B01J 8/082* (2013.01); *B01J 8/085* (2013.01);
(Continued)

(58) Field of Classification Search
CPC ................................ C08F 2/001; C08F 10/00
See application file for complete search history.

(56) References Cited

U.S. PATENT DOCUMENTS

| 4,767,735 | A | * | 8/1988 | Ewen | ....................... C08F 10/06 526/90 |
| 2004/0044148 | A1 | | 3/2004 | Bidell et al. | |
| 2014/0121337 | A1 | | 5/2014 | Yu et al. | |

FOREIGN PATENT DOCUMENTS

| EP | 0279153 A2 | 8/1988 |
| EP | 0446059 A1 | 9/1991 |

(Continued)

OTHER PUBLICATIONS

International Search Report for International Application No. PCT/EP2020/076634, International Filing Date Sep. 23, 2020, Date of Mailing Jan. 27, 2021, 5 pages.
(Continued)

*Primary Examiner* — Catherine S Branch
(74) *Attorney, Agent, or Firm* — CANTOR COLBURN LLP

(57) ABSTRACT

The present invention relates to a process for the polymerization of olefin monomers in the presence of a catalyst system, using a tubular pre-polymerization reactor, wherein the tubular pre-polymerization reactor has a length L and the flow of a catalyst system is introduced in the tubular pre-polymerization reactor in the middle (30-70% of L) or the end (70-95% of L) of the tubular pre-polymerization reactor.

12 Claims, 3 Drawing Sheets

(51) Int. Cl.
*B01J 8/14* (2006.01)
*B01J 8/18* (2006.01)
*C08F 10/06* (2006.01)

(52) U.S. Cl.
CPC ............. *B01J 8/087* (2013.01); *B01J 8/14* (2013.01); *B01J 8/1827* (2013.01); *C08F 10/06* (2013.01); *B01J 2208/0053* (2013.01)

(56) References Cited

FOREIGN PATENT DOCUMENTS

| EP | 0819706 | A1 | 1/1998 |
| JP | 2000017005 | A1 | 1/2000 |
| WO | 9632427 | A1 | 10/1996 |
| WO | 2007033941 | A1 | 3/2007 |

OTHER PUBLICATIONS

Pullukat, Thomas J. and Hoff, Raymond E., "Silica-Bases Ziegler-Natta Catalystis: A Patent Review", Catal. Rev.- Sci. Eng. 41(3&4), 1999, pp. 389-438.
Written Opinion for International Application No. PCT/EP2020/076634, International Filing Date Sep. 23, 2020, Date of Mailing Jan. 27, 2021, 7 pages.

\* cited by examiner

POLYMERIZATION PROCESS FOR OLEFINS

CROSS REFERENCE TO RELATED APPLICATIONS

This application is a National Stage application of PCT/EP2020/076634, filed Sep. 23, 2020, which claims the benefit of European Application No. 19199315.3, filed Sep. 24, 2019, both of which are incorporated by reference in their entirety herein.

TECHNICAL FIELD OF THE INVENTION

The present invention relates to process for the polymerization of olefin monomers in the presence of a catalyst system, comprising a pre-polymerization step in a tubular pre-polymerization reactor. The invention also relates to the pre-polymerization reactor used in the process.

TECHNOLOGICAL BACKGROUND OF THE INVENTION

The present invention concerns the field of polyolefin manufacturing. It is known to produce polyolefins, in particular polypropylene in a gas phase process using a catalyst system, in particular Ziegler-Natta solid catalysts.

One of the problems associated with this process, in particular in a gas phase process, is the formation of fines. Fines are very small and active catalytic particles formed upon the uncontrolled fragmentation of the catalytic support. Practically their size it too small so they yield no valuable product.

Another problem is that in the beginning of the polymerization the catalytic particles, being very active, may undergo thermal runaway (i.e. overheating) resulting in early deactivation, or the particles may become sticky leading to fouling or the creation of lumps.

In order to prevent these phenomena, it has been proposed to introduce a pre-polymerization, prior to the main polymerization. This pre-polymerization can take place under relatively mild conditions, i.e. either at low temperature or low monomer concentration. It can be described as an appropriate step to prepare, activate and protect the catalyst, before being exposed to the intensive conditions prevailing in the main polymerization reactor.

In the prior art, it has been described to carry out the pre-polymerization step in loop reactors, continuous stirred tank reactors or in tubular reactors. If the pre-polymerization step is carried out in a tubular reactor, it is important to design it such that a relatively narrow residence time distribution and particle size distribution is obtained. It is also important to avoid settling of the catalyst particles, i.e. the particles must remain fluidized in the process fluid along the tubular axis. This requires a minimum monomer mass flow rate. At the same time, the monomer mass flow rate must not become too high since a high monomer mass flow rate may be difficult to handle in the following main polymerization process.

Furthermore, the pre-polymerization should result in a minimum pre-polymerization yield to avoid overheating and runaway in the main gas phase polymerization process.

Also, in order to achieve good catalyst shape replication and polymer particle morphology, the reactor operation should be kept as close to isothermal operation as possible, e.g. my maintaining a maximum temperature gradient.

Moreover, it is desirable to have a pre-polymerization process that is not only suitable for one type of catalyst system, but that can accommodate catalyst systems with different activities.

EP279153 describes that the pre-treatment of the catalyst under pre-polymerization conditions is carried out over a relatively short and closely controlled residence time in an elongated tubular reactor that feeds to the polymerization zone. In this document the catalyst is supplied in a solvent/carrier fluid and the monomer is added to the catalyst stream.

US20040044148 describes a process for pre-activating catalysts for the polymerization of $C_{2-20}$ olefins wherein the catalyst, olefin monomer and optionally co-catalyst are mixed and then passed through a tube reactor before being introduced in to the actual polymerization reactor. The mixture of catalyst, any co-catalyst and monomer is passed through the tube reactor in turbulent plug flow. A tube reactor is exemplified with a length of 100 m and a diameter of 6 mm.

WO2007/033941 describes that a pre-polymerization is carried out by contacting a gas of olefins with a catalyst in a gas-phase tubular reactor at a temperature from 30° C. to 130° C. in order to obtain a polymerization degree up to 500, preferably 0.1 to 100 g polymer/g catalyst system. The gas-phase tubular reactor has a length/diameter ratio in the range from 100 to 2000. The pre-polymer thus obtained is fed into a successive gas-phase polymerization reactor.

US2014/0121337 describes a method for the polymerization of polypropylene with a pre-polymerization which is preferably carried out in a stirred reaction kettle. The temperature for pre-polymerization ranges from −10° C. to 50° C. and the pressure is from 0.1 MPa to 10.0 MPa. The pre-polymerization degree is controlled in the scope from 2 to 3000 g polymer/g catalyst.

The present inventors have found that with the prior art designs of the pre-polymerization process, it has not been possible to fulfil all the design requirements as described above.

SUMMARY

The present invention thus provides a process for the gas-phase polymerization of olefin monomers in the presence of a catalyst system, comprising:
  feeding a liquid flow of one or more olefin monomers into a tubular pre-polymerization reactor;
  contacting the flow of one or more olefin monomers with a flow of a catalyst system in the tubular pre-polymerization reactor to obtain a pre-polymer;
  feeding the pre-polymer obtained in step b) to a polymerization reactor;
  wherein the tubular pre-polymerization reactor has a length L and the flow of a catalyst system is introduced in the tubular pre-polymerization reactor in the middle (30-70% of L) or the end (70-95% of L) of the tubular pre-polymerization reactor.
  wherein the tubular pre-polymerization reactor has a Length/Diameter (L/D) ratio of 1,000 to 50,000.

The advantage of using a process with different sites of injection of the catalyst system is that it offers a large design flexibility.

The process of the invention allows to operate within the following constraints:
  maximum temperature gradient along the reactor axis;
  maximum monomer mass flow in the reactor;

minimum pre-polymerization yield in the order of seconds;

an inlet temperature of 5 to 50° C.

DETAILED DESCRIPTION

Figure 1:
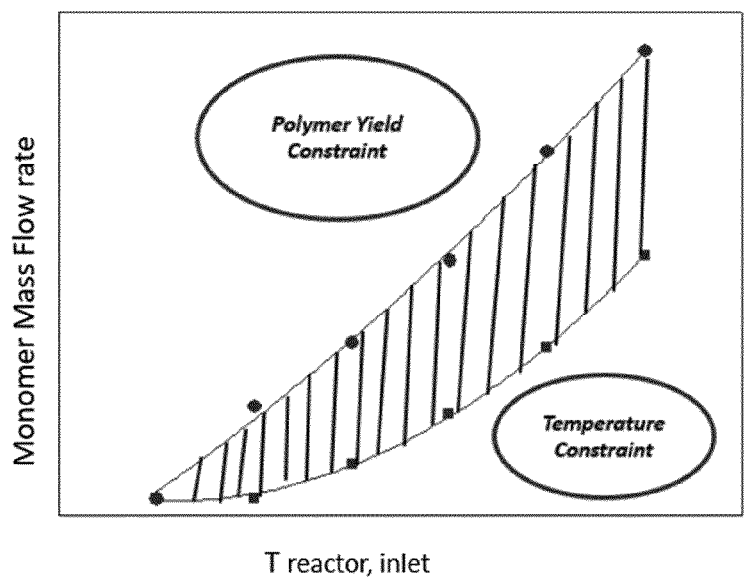
FIG. 1 shows the optimal operating area for a pre-polymerization process. The propylene mass flow rate is on the vertical axis and the inlet temperature on the horizontal x axis. The region where the reactor should be operating is the crosshatched area bounded by the two lines of the operating graph.

In FIG. 1, the olefin monomer mass flow rate is on the vertical axis and the inlet temperature on the horizontal x axis. The region where the reactor should be operating is the crosshatched area bounded by the two lines of the operating graph.

Above the upper line of the plot the inlet temperature might be too low or the monomer mass flow rate very high or a combination of the previous so that the minimum required pre-polymerization yield is never reached, violating the yield constraint. When operating below the lower line, a combination of long residence time (low monomer mass flow rate) and a relatively high inlet temperature will result in a high pre-polymerization yield but at a temperature gradient that is too high, thus violating the temperature constraint.

The present invention is based on a multi-injection concept which results in a larger operating area and allows flexibility when using catalysts with different activities.

Figure 2:
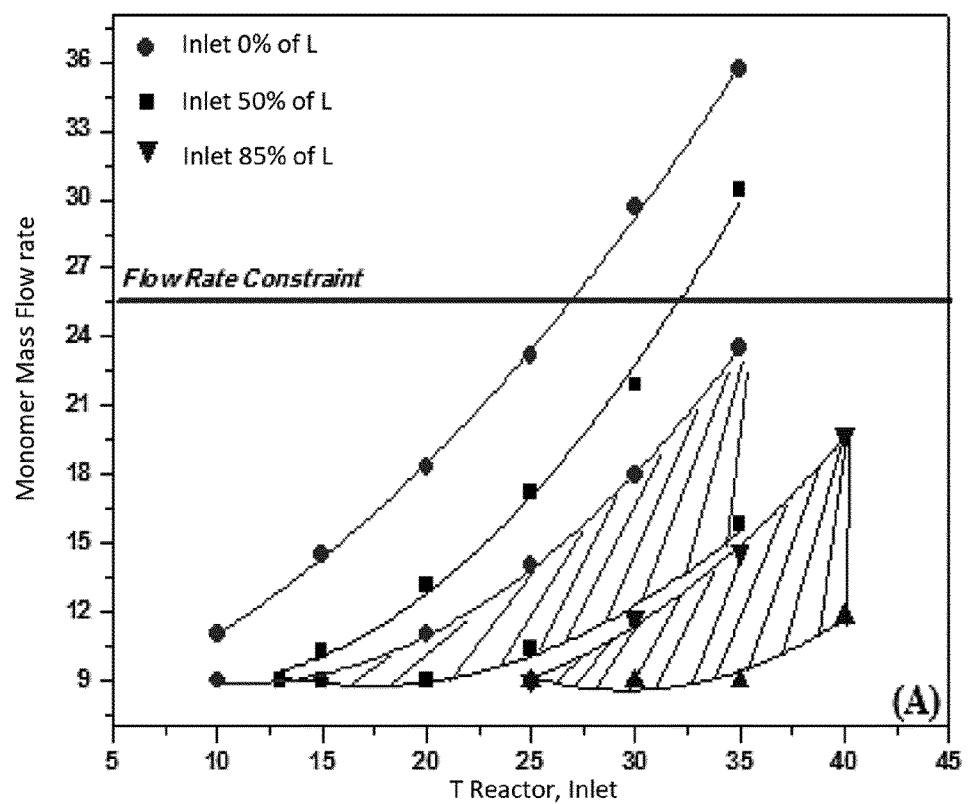
FIG. 2 shows the optimal operating area for the multi-injection concept of the invention.

This is illustrated in FIG. 2 for one type of catalyst. High yields can be achieved at a relatively small reactor volume. This illustrates that with the process of the invention, the amount of design choices increases. For a very active catalyst, the end injection point can be chosen so as to achieve the desired pre-polymer yield in a relatively short time.

To ensure the successful suspension of the solid phase in the process fluid, only the catalyst will be injected at different points in the reactor. The liquid monomer will always be fed in the beginning of the tubular rector. The impetuous flow of monomer will ensure the appropriate fluidization of the solid catalytic particles upon their entry into the tubular reactor.

As described above, the catalyst system is introduced at one of two inlets along the axis of the tubular pre-polymerization reactor. This can be in the in the middle (30-70% of L) or the end (70-95% of L) of the tubular pre-polymerization reactor. Thus if the tubular reactor has a total length of 100 m, the catalyst system can be introduced at a point 30-70 m or 70-95 m from the beginning of the tubular reactor, wherein the beginning is defined as the point where the monomer flow is introduced, and the end is defined as the point where the prepolymer stream leaves the tubular reactor and is transferred to the main polymerization reactor.

The tubular pre-polymerization reactor is designed such that it has a Length/Diameter (L/D) ratio of 1,000 to 50,000, preferably 5,000 to 35,000.

The preferred operating conditions for the pre-polymerization process of the invention are as follows: the pre-polymerization degree is from 0.5 to 220 g pre-polymer/g catalyst system. The inlet temperature of the flow of one or more olefin monomers at the beginning of the tubular pre-polymerization reactor is from 5 to 50° C. The maximum temperature is determined by the inlet temperature of the first zone of the gas phase polymerisation reactor. The tubular pre-polymerization reactor can be insulated to ensure adiabatic operation.

The particle size of the pre-polymer is not critical as long as there is no clogging of the reactor. Residence time in the pre-polymerization reactor and particle size can be optimized to achieve the desired operation.

The pre-polymerization process of the invention can be used for any olefin monomer or mixture of olefin monomers that needs to be polymerized. It is preferably used for the polymerization of propylene and/or ethylene and optionally further olefin monomers, such as butene and hexene. Thus it is possible to produce homopolymers of ethylene or propylene or copolymers of ethylene and/or propylene with one of more olefin monomers having from 4 to 8 carbon atoms.

When the process of the invention is used for the copolymerization of ethylene and/or propylene with olefin monomers, the ethylene and/or propylene preferably is used as the major component of the copolymer. For example, the amount of ethylene and/or propylene present in the copolymer is at least 65% by weight, for example at least 70% by weight, for example at least 80% by weight based on the total copolymer.

Preferably the process of the invention is used for the polymerization of ethylene, propylene, or mixtures thereof.

The catalyst system can be any catalyst system known for the polymerization of olefin monomers. The catalyst system can be a Ziegler-Natta type catalyst or a metallocene type catalysts. Such catalyst systems are known in the art.

Ziegler-Natta catalyst systems and their components are suitable for preparing a polyolefin and are generally known. "Ziegler-Natta" (Z-N) refers to catalyst systems comprising a transition metal-containing solid catalyst compound (also typically referred to as a procatalyst); an organometallic compound (also typically referred to as a co-catalyst) and one or more electron donor compounds (e.g. external electron donors). An overview of such catalyst types is for example given by T. Pullukat and R. Hoff in Catal. Rev.—Sci. Eng. 41, vol. 3 and 4, 389-438, 1999. The preparation of such a procatalyst is for example disclosed in WO96/32427A1.

An example of a suitable Ziegler-Natta catalyst comprises a reaction product of the following components:

an titanium-containing solid catalyst component, which can be the reaction product of an alkoxy magnesium compound, a titanium compound and an internal electron donor compound;

an alkyl aluminium compound; and optionally an external electron donor component.

The titanium compound can be selected from compounds of formula $Ti(OR)_{4-x}X_n$ in which R is selected from $C_1$-$C_{14}$ aliphatic or aromatic hydrocarbonyl groups, X is a halogen atom, n is an integer from 0 to 4. The internal electron donor compound can be selected from alkyl esters of aliphatic and aromatic monocarboxylic acids, alkyl esters of aliphatic and aromatic polycarboxylic acids, aliphatic ethers, cycloaliphatic ethers and aliphatic ketones.

The pre-polymer obtained in the tubular pre-polymerization reactor is fed to a polymerization reactor. This can be any conventional polymerization reactor used in the polymerization of olefin monomers, in particular a gas phase polymerization reactor, such as a fluidized bed reactor, a stirred bed reactor or a gas-phase reactor having interconnected polymerization zones.

The present invention also relates to an apparatus for the polymerization of one or more olefin monomers comprising a tubular pre-polymerization reactor connected to a polymerization reactor, wherein the tubular pre-polymerization reactor has a length L and comprises:

- an inlet for feeding a liquid flow of one or more olefin monomers at the beginning of the tubular pre-polymerization reactor,
- an inlet for feeding a catalyst system at the middle of the tubular reactor (30-70% of L) and
- an inlet for feeding a catalyst system at the end of the tubular reactor (70-95% of L)
- an outlet at the end of the reactor for transferring the pre-polymer to the polymerization reactor.

Preferably the tubular pre-polymerization reactor is a helical coil with a Length/Diameter (L/D) ratio of 1,000 to 50,000, preferably 5,000 to 35,000.

Figure 3:
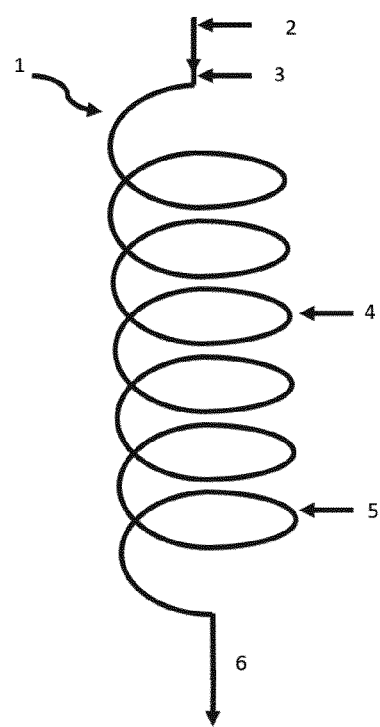
FIG. 3 illustrates the pre-polymerization tubular reactor of the invention (not to scale).

In FIG. 3 illustrates the pre-polymerization tubular reactor of the invention (not to scale).

The olefin monomer enters the tubular reactor 1 at inlet 2.

The possible inlets for the catalyst system are designated as 3 (0-10% of L) (in case the reactor is operated in a conventional manner),
4 (30-70% of L) and
5 (70-95% of L).

At 6, the pre-polymer exists the tubular reactor and is transported to the main polymerization reactor (not shown).

In order to assess the process design of the present invention, batch experiments were conducted in bench scale CSTR reactors with a volume of 1.8 l and provided with a helical ribbon impeller. The batch reactor operated at constant temperature (isothermally) using a cooling jacket.

The pre-polymerization yields after a certain pre-polymerization time and at fixed temperature were compared to the values estimated for the reactor design of the invention. The pre-polymerization yields predicted for the process of the present invention were in good agreement with the experimental values in the batch reactors showing that the expected advantages predicted for the process of the invention can be achieved.

EXAMPLES

The following example are a non-limitative ones, in which the invented tubular, multi-injection reactor as illustrated in FIG. 3, has a total volume of 2.65 L and the injection points shown in following table.

| Injection Point | Volume (L) | Length (m) |
| --- | --- | --- |
| $1^{st}$ (inlet) | 2.65 | 135 |
| $2^{nd}$ (30-70% of L) | 1.33 | 68 |
| $3^{rd}$ (70-95% of L) | 0.4 | 20 |

A ZN catalyst A (Cat. A) has been injected in the $1^{st}$ inlet, for prepolymerization to take place in reactor volume of 2.65 L, at minimum propylene monomer mass flow rate (MMFR) of 12 kg/h, inlet temperatures of 15° C. and operating the reactor adiabatically. The obtained resulting residence time was 9.3 minutes and prepolymerization yields of 53 g-PP/g-cat.

When the same setup is operated at the maximum propylene monomer mass flow rate of 25 kg/h, inlet temperatures kept constant at 15° C. The obtained resulting residence time would be 8.4 minutes and prepolymerization yield achieved would be slightly reduced to 45 g-PP/g-cat, A ZN catalyst A (Cat. A) has been injected in the $2^{nd}$ or $3^{rd}$ inlet, at inlet temperatures ranging from 10 to 35° C. for 1.33 L volume ($2^{nd}$ inlet) and at inlet temperatures ranging from 25 to 40° C. for 0.4 L volume ($3^{rd}$ inlet) respectively and a chosen propylene mass flow (below 25 kg/h) and operating the reactor operating adiabatically.

The obtained achievable residence times in the reactors can range from 1 to 10 minutes and results in prepolymerization yields ranging from 1 to 220 g-PP/g-cat.

Additionally a ZN catalyst A (Cat. A) has been injected in the $3^{rd}$ inlet (0.4 L volume) when operating at 25° C. inlet temperature and 9 kg/hr MMFR in a, the prepolymerization yield of 1 g-PP/g-cat is achieved; when operating at 10° C. inlet temperature and 25 kg/hr MMFR in a 0.4 L volume, the prepolymerization yield of 5 g-PP/g-cat is achieved.

The invention claimed is:

1. A process for the polymerization of olefin monomers in the presence of a catalyst system, the process comprising:
    a. feeding a liquid flow of one or more olefin monomers into a tubular pre-polymerization reactor;
    b. contacting the liquid flow of one or more olefin monomers with a flow of a catalyst system in the tubular pre-polymerization reactor to obtain a pre-polymer;
    c. feeding the pre-polymer obtained in step b) to a polymerization reactor;
    wherein the tubular pre-polymerization reactor has a length L and the flow of the catalyst system is introduced in the tubular pre-polymerization reactor in the middle within 30-70% of L or at the end within 70-95% of L of the tubular pre-polymerization reactor,
    wherein the tubular pre-polymerization reactor has a Length/Diameter (L/D) ratio of 1,000 to 50,000.

2. The process according to claim 1, wherein the tubular pre-polymerization reactor has a Length/Diameter (L/D) ratio of 5,000 to 35,000.

3. The process according to claim 1, wherein the one or more olefin monomers are selected from ethylene, propylene, or a combination thereof.

4. The process according to claim 1, wherein the one or more olefin monomers are polymerized to a pre-polymerization degree from 0.5 to 220 g pre-polymer/g catalyst system.

5. The process according to claim 1, wherein the inlet temperature of the flow of one or more olefin monomers at a beginning of the tubular pre-polymerization reactor is from 5 to 50° C.

6. The process according to claim 1, wherein the catalyst system is a Ziegler-Natta catalyst system.

7. The process according to claim 1, wherein the tubular pre-polymerization reactor is a helical coil.

8. The process according to claim 1, wherein the polymerization reactor is a gas phase polymerization reactor.

9. The process according to claim 8, wherein the gas phase polymerization reactor is selected from fluidized bed reactors, stirred bed reactors, or gas-phase reactors having interconnected polymerization zones.

10. An apparatus for the polymerization of one or more olefin monomers comprising a tubular pre-polymerization reactor connected to a polymerization reactor, wherein the tubular pre-polymerization reactor has a length L and comprises an inlet for feeding a liquid flow of one or more olefin monomers at a beginning of the tubular pre-polymerization reactor, an inlet for feeding a catalyst system in the middle of the tubular actor within 30-70% of L, an inlet for feeding a catalyst system at the end of the tubular reactor within 70-959 of L, and an outlet at the end of the reactor for transferring the pre-polymer to the polymerization reactor, wherein the tubular pre-polymerization reactor has a Length/Diameter (L/D) ratio of 1,000 to 50,000.

11. The apparatus according to claim 10, wherein the tubular pre-polymerization reactor is a helical coil.

12. The apparatus according to claim 11, wherein the tubular pre-polymerization reactor has a Length/Diameter (L/D) ratio of 5,000 to 35,000.

* * * * *